United States Patent [19]
Jamail

[11] Patent Number: 5,808,974
[45] Date of Patent: Sep. 15, 1998

[54] METHOD OF MASKING DATA ON A STORAGE MEDIUM USING A DIRECTORY

[76] Inventor: Randall H. Jamail, P.O. Box 980369, Houston, Tex. 77098

[21] Appl. No.: 574,811

[22] Filed: Dec. 19, 1995

Related U.S. Application Data

[63] Continuation-in-part of Ser. No. 510,201, Aug. 2, 1995, Pat. No. 5,608,701, which is a continuation of Ser. No. 343,637, Nov. 22, 1994, Pat. No. 5,467,327, which is a continuation-in-part of Ser. No. 301,040, Sep. 6, 1994, Pat. No. 5,471,443, which is a continuation of Ser. No. 172,849, Dec. 22, 1993, abandoned.

[51] Int. Cl.$^6$ ................................................. G11B 17/22
[52] U.S. Cl. ................................. 369/32; 369/275.3
[58] Field of Search ............................. 369/32, 47, 33, 369/13, 54, 56, 58, 48, 44.39, 44.26, 30, 284, 275.3, 275.2, 286, 288, 100; 360/71, 49, 72.1, 72.2, 78.4

[56] References Cited

U.S. PATENT DOCUMENTS

| | | | |
|---|---|---|---|
| Re. 34,475 | 12/1993 | Custers et al. | 369/32 |
| 4,363,116 | 12/1982 | Kleuters et al. | 369/30 |
| 4,420,828 | 12/1983 | Yoshida et al. | 369/47 |
| 4,719,611 | 1/1988 | Miura et al. | 369/47 |
| 4,719,615 | 1/1988 | Feyrer et al. | 369/284 |
| 5,001,689 | 3/1991 | Bass et al. | 369/33 |
| 5,031,172 | 7/1991 | Umeda et al. | 369/275 |
| 5,036,511 | 7/1991 | Goldberg et al. | 369/284 |
| 5,059,473 | 10/1991 | Takahushi et al. | 428/162 |
| 5,080,946 | 1/1992 | Takahushi et al. | 428/64 |
| 5,117,416 | 5/1992 | Miyadera et al. | 369/284 |
| 5,157,646 | 10/1992 | Amemiya et al. | 369/47 |
| 5,200,948 | 4/1993 | Goldberg et al. | 369/284 |
| 5,255,260 | 10/1993 | Yamada et al. | 369/199 |
| 5,274,617 | 12/1993 | Terashima et al. | 369/54 |
| 5,293,568 | 3/1994 | Oshiba et al. | 369/32 |
| 5,467,327 | 11/1995 | Jamail | 369/32 |
| 5,471,443 | 11/1995 | Jamail | 369/32 |

FOREIGN PATENT DOCUMENTS

| | | |
|---|---|---|
| 0 277 019 A2 | 8/1988 | European Pat. Off. . |
| 0 339 929 A2 | 11/1989 | European Pat. Off. . |
| 0 453 108 A2 | 10/1991 | European Pat. Off. . |
| 0 465 246 A2 | 1/1992 | European Pat. Off. . |
| WO93/01593 | 1/1993 | WIPO . |

OTHER PUBLICATIONS

Jan. 22, 1994; Billboard Newspaper, p. 20, Popular Uprising, Coverage of New and Developing Propects For The Heatseekers Chart, "Initiated" Article, Geoff Mayfield and Brett Atwood.

Apr. 16, 1994; Billboard Newspaper, Pro Audio; "Hidden Track Exposes Conflict;" Article, Paul Verna.

*Primary Examiner*—Ali Neyzari
*Attorney, Agent, or Firm*—Alton W. Payne

[57] ABSTRACT

Magneto-optical medium has a directory with information about the medium for communicating with the player or transcriber including information with respect to each data track and each index. The directory information provides control to the player for effective interaction with the medium. An optical medium containing data for communication with a player, transcriber or the like. The medium comprises a start location, a stop location, a directory, at least one data track between the start location and the stop location and a pregap or gap.

6 Claims, 9 Drawing Sheets

| TRACK | INDEX | DESCRIPTION |
|-------|-------|-------------|
| 0 | 0 | Begin play point |
| 1 | 1 | Start Track 1 |
| 1 | 0 | Stop Track 2 |
| 2 | 1 | Start Track 1 |
| 2 | 0 | Stop Track 2 |
| ... | ... | ... |
| X | 0 | Stop Track X |

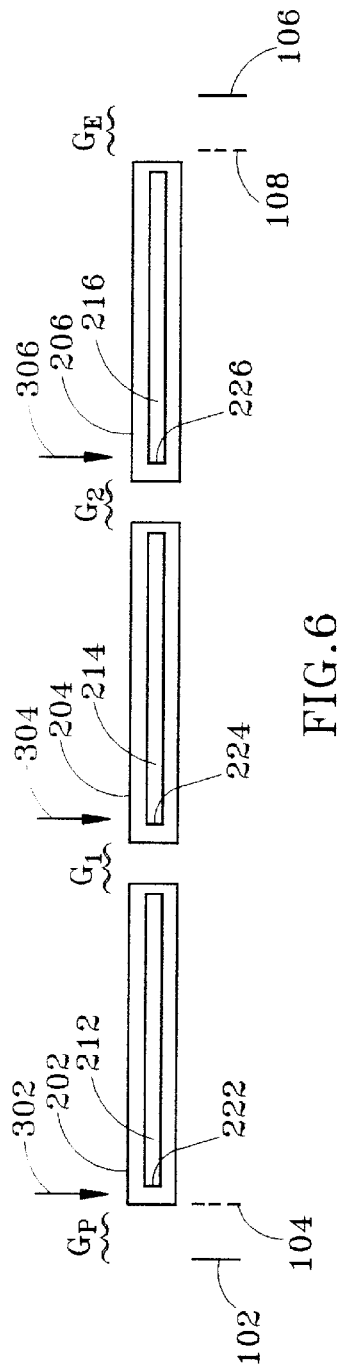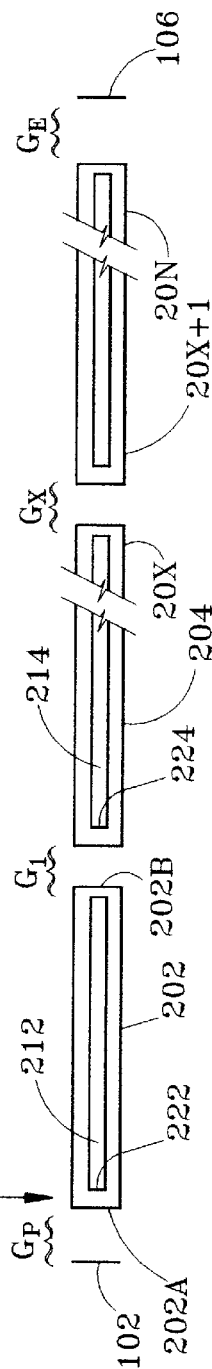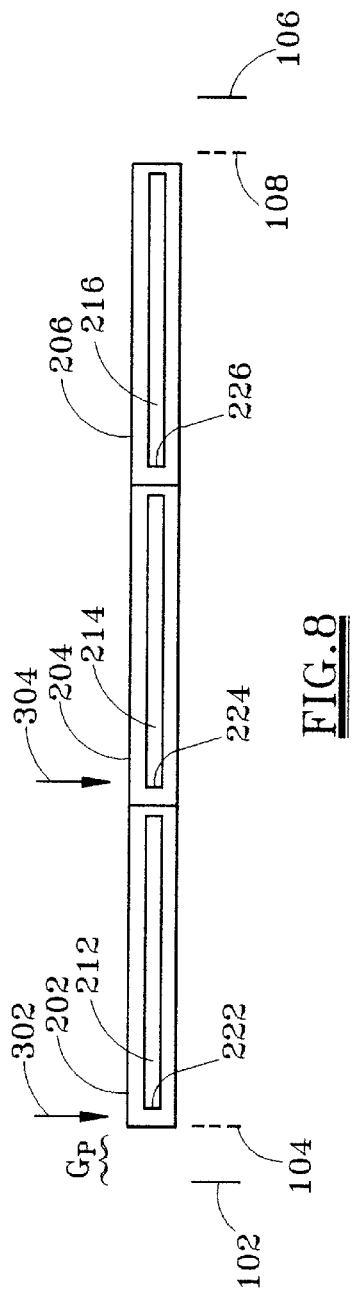

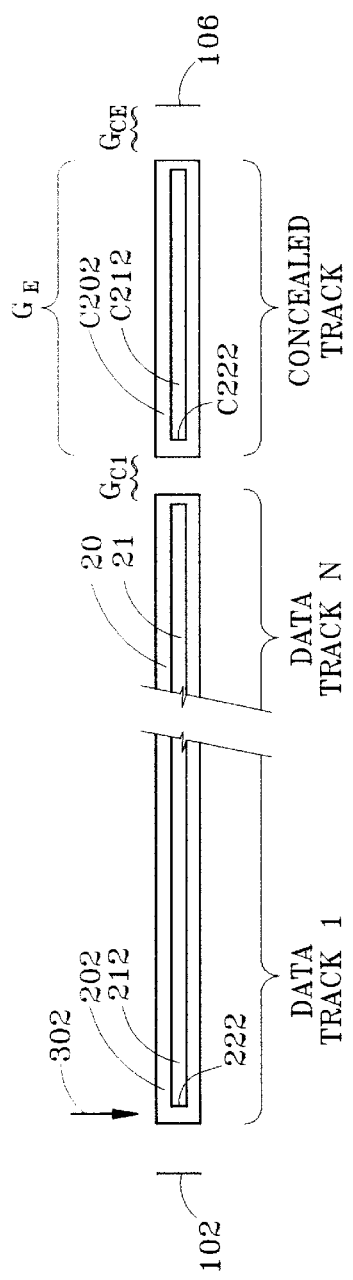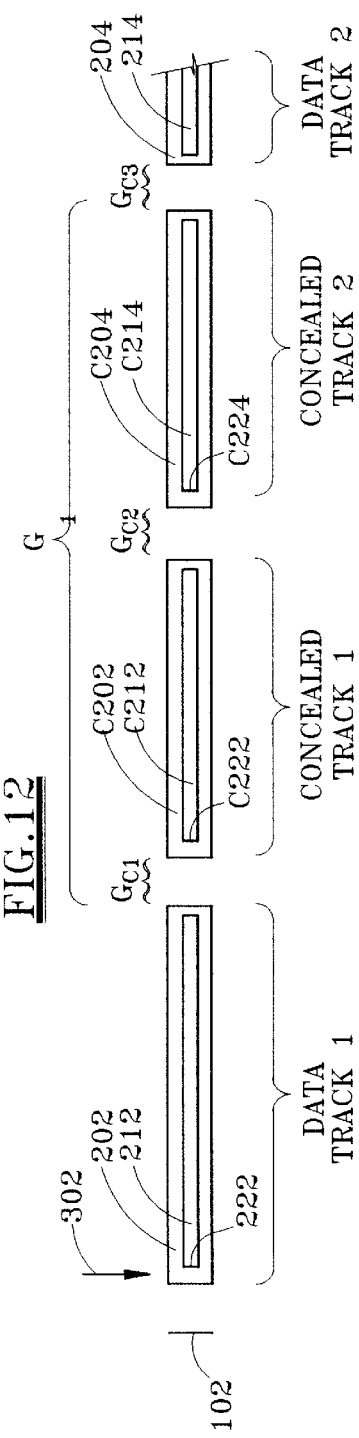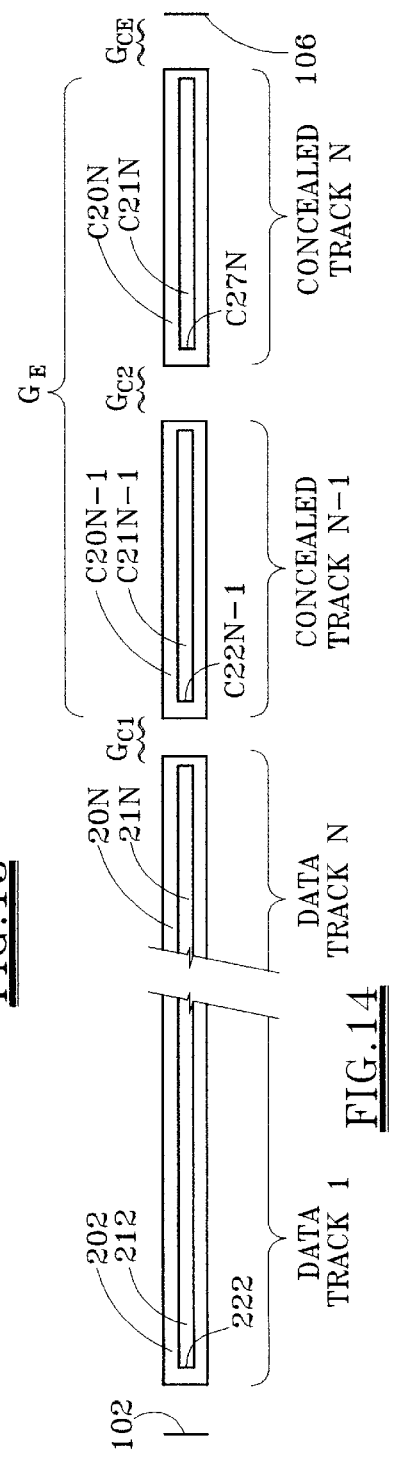

METHOD OF MASKING DATA ON A STORAGE MEDIUM USING A DIRECTORY

CROSS REFERENCE TO RELATED APPLICATION

The present application is a continuation-in-part application of the application bearing U.S. Ser. No. 08/510,201, filed Aug. 2, 1995, now U.S. Pat. No. 5,608,701, entitled "Method of Masking Data on a Storage Medium," which was a continuation of the application bearing U.S. Ser. No. 08/343,637, filed Nov. 22, 1994, entitled "Method of Masking Data on a Storage Medium," now U.S. Pat. No. 5,467,327 which is a continuation-in-part of Ser. No. 08/301,040 filed Sep. 6, 1994, now U.S. Pat. No. 5,471,443 which is a continuation of Ser. No. 08/172,849 filed Dec. 22, 1993, now abandoned.

FIELD OF THE INVENTION

The present invention relates to a method of masking data on a storage medium for selective playback upon demand or for transcription to another medium. Specifically, the present invention relates to adapting a storage medium for recording information on such medium in gaps adjacent to the data tracks and using a directory and subcodes for controlled interaction between the medium and the player.

BACKGROUND OF THE INVENTION

Data storage media are well known. Particularly, optical data storage media in the form of compact disks are well known. Compact disks are an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process is referred to herein as the "mastering" process. The mastering process starts by first polishing a plain glass optical disk. The disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photoresist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, typically known as the glass master, then undergoes nickel electrocasting, a process which is similar to that used in making analog phonograph records. A series of metal replications follow, resulting in a disk called a stamper. The stamper is equivalent to a photographic negative in the sense that it is a reverse of the final compact disk; that is, there are now bumps where there were pits. This stamper is then used to make a pressing on a transparent polymer such as polyvinyl chloride, poly(ethyl-metacrylate) or a polycarbonate. The stamped surface is then plated with a reflective film such as aluminum or another metal, and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players. Media on which data can be recorded directly on and read directly from have a different configuration and operate under a somewhat different principle. One example is described in U.S. Pat. No. 4,719,615 (Feyrer et al.).

As optical information recording media of this type, compact disks (herein referred to simply as "CD") have been practically developed and widely used as optical information recording media of ROM (read only memory) type wherein pits are already formed on a light transmitting substrate by means of, for example, a press and a reflective layer of a metal is formed on the surface having such pits. As a further progress from such a ROM type, optical information recording media have been proposed on which information can be recorded by irradiating a laser beam to the substrate as the user requires. For Example, Japanese Unexamined Patent Publication No. 89605/1979 discloses an optical information recording medium which comprises at least a transparent substrate, a light absorptive layer containing a coloring matter formed on the substrate and a light reflective layer formed on the light absorptive layer, and on which information can optically be recorded and from which the recorded information can be reproduced.

To conduct the reproduction by commercially available CD players, optical recording media must be able to produce read-out signals which satisfy the CD standards which are accepted world wide. To satisfy the CD standards, typical requirements are that the reflectance is at least 70%; the block error rate is at most $3.0 \times 10^{-2}$; and when a push-pull method is employed for tracking pits, the push-pull valve is from 0.04 to 0.07.

However, none of the conventional recording media comprising a substrate having a pregroove, a light absorptive layer containing a coloring matter formed on the substrate and a light reflective layer formed on this absorptive layer, uses all the aspects of the CD format satisfying the various conditions prescribed by the CD standards.

It is, therefore, a feature of the present invention to provide a method of recording data for masking or concealing the data for later playback upon demand using a directory.

Another feature of the present invention is to provide a method of masking data on a storage medium for positioning at least one data track on the storage medium such that the data track has, adjacent thereto, enough space or time for accepting a concealed data track.

Yet another feature of the present invention is to provide a method of masking data on a storage medium for positioning a last data track on the storage medium such that the data track has adjacent thereto, and after the last data track, enough space or time for accepting a concealed data track.

Yet another feature of the present invention is to provide a method of masking data on a storage medium for impressing data on the storage medium for generating a concealed track which concealed track is in operative association with a directory.

Still another feature of the present invention is to provide a method of masking data on a storage medium for impressing data on the storage medium for generating a hidden recording area such that the hidden recording area contains concealed data which can be accessed via a directory upon demand for transcription to another medium or for playback.

Yet still another feature of the present invention is to provide a method of masking data on a storage medium such as, for example, a compact disk, a read-only memory compact disk, a mini-disk, a photo compact disk, a digital versatile disc, a digital video disc or the like for impressing data on the storage medium for generating a concealed track which can be accessed via a directory upon demand for transcription to another medium or for playback.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a method of masking data on a storage medium for selective playback via a directory upon demand or for transcription to another medium is provided.

The method of masking data on a magneto-optical medium for selective playback upon demand or for transcription to another medium provides that the magneto-optical medium is adapted for communication with a player or transcriber. Typically, the magneto-optical medium has a start location and a stop location with a pregap and at least one data track on the medium. The pregap precedes the first track. The pregap is defined as at least one of sufficient location or time for accepting data. Each data track includes a data recording area for executing at least one of recording and reproducing the data, and each data track includes at least one index. The index identifies the beginning of at least one of recording and reproducing data. Typically, the first index in any data track is a start index indicative of a beginning location for the data recording area for that track. The start location of the magneto-optical medium precedes the first start index for the first track for at least one of location or time, and the stop location of the magneto-optical medium follows the last data recording area for the last track for at least one of location or time. The magneto-optical medium has a directory with information about the medium for communicating with the player or transcriber including information with respect to each data track and each index. The directory information provides control to the player for effective interaction with the medium.

The method of masking data comprises the step of impressing data within the pregap for generating a concealed track adjacent the data track. The concealed track contains concealed data which can be accessed upon demand for transcription to another medium or for playback. The step of accepting one or more index in the concealed track within the pregap provides that the index denotes the begin location for a particular segment of the concealed data within the concealed track. The step of impressing concealed track information in the directory provides for communication with the player. The concealed track information enables the magneto-optical medium and the player or transcriber to communicate with respect to the concealed track. The step of engaging the medium with the player for communication between the medium and the player such that the directory information guides the player for selective playback upon demand of at least one of tracks, concealed tracks and any particular segment of the concealed data within the concealed track.

In another embodiment of the present invention, a method is provided comprising the step of positioning at least one data track on the magneto-optical medium between the start location and the stop location. A step is provided for maintaining adjacent to the data track at least one of sufficient location or time which sufficient location or time is defined as a gap, A step is provided for impressing data within the gap for generating a concealed track adjacent the data track. The concealed track contains concealed data which can be accessed upon demand for transcription to another medium or for playback. Further, concealed track information is impressed in the directory for communication with the player where the concealed track information enables the magneto-optical medium and the player or transcriber to communicate with respect to the concealed track.

More particularly, the method of the present invention provides for accepting one or more index within the concealed track. The index denotes the begin location for a particular segment of the concealed data within the concealed track. Also more particularly, the method of the present invention provides for engaging the medium with the player for communication between the medium and the player such that the directory information guides the player for selective playback upon demand of the tracks or the concealed tracks for transcription to another medium or for playback.

In yet another embodiment of the present invention an article is provided containing data for communication with a player, transcriber or the like. The article comprises a start location, a stop location, a directory, at least one data track between the start location and the stop location and a pregap. The directory is impressed on the medium and has information about the medium for communication with the player including information with respect to each data track and each index. The directory information provides control to the player for effective interaction with the medium. The data tracks are between the start location and the stop location. Each data track has a data recording area and at least one index. The data recording area is for executing at least one of recording and reproducing the data. The index is indicative of a beginning location for the data recording area for a segment of the track and the start location precedes the first index for the first track for at least one of location or time. The stop location follows the last data recording area for the last track for at least one of location or time. The first index is indicative of the beginning of the data recording area for a first track and the index for each subsequent track, if any, is indicative of the beginning of the data recording area for the respective track, such that at least one data track is on the article between the start location and the stop location. The pregap is prior to the first track index. The pregap comprises data impressed on the article including at least one index. The pregap defines a concealed track having a hidden recording area containing concealed data which can be accessed upon demand by the player or transcriber for transcription to another medium or for playback. The index is indicative of the begin location for a segment of the concealed data within the concealed track of the pregap. The engagement of the medium with the player provides communication between them whereby the directory information guides the player for selective playback upon demand of the tracks, the concealed tracks or any segment of the concealed data within the concealed track.

In still another embodiment of the present invention an article is provided containing a start location, a stop location, a directory, at least one data track between the start location and the stop location and a gap. The directory is impressed on the medium and has information about the medium for communication with the player including information with respect to each data track and each index. The directory information provides control to the player for effective interaction with the medium. The data tracks are between the start location and the stop location. Each data track has a data recording area and at least one index. The data recording area is for executing at least one of recording and reproducing the data. The index is indicative of a beginning location for the data recording area for a segment of the track and the start location precedes the first index for the first track for at least one of location or time. The stop location follows the last data recording area for the last track for at least one of location or time. The first index is indicative of the beginning of the data recording area for a first track and the index for each subsequent track, if any, is indicative of the beginning of the data recording area for the respective track. The gap is adjacent any track. The gap comprises data impressed on the article including at least one index. The gap defines a concealed track having a hidden recording area containing concealed data which can be accessed upon demand by the player or transcriber for transcription to another medium or for playback. The index is indicative of the begin location for a segment of the concealed data within the concealed track of the gap. The engagement of the medium with the player provides communication between them whereby the directory information guides the player for selective playback upon demand of the tracks, the concealed tracks or any segment of the concealed data within the concealed track.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

FIG. 6 is a schematic illustration of a representative configuration embodying a track layout adaptable for use with the present invention.

FIG. 7 is a generic illustration of the representative configuration as illustrated in FIG. 6.

FIG. 8 illustrates a representative configuration of a track layout adaptable for use with the present invention.

FIG. 12 illustrates yet another embodiment of the present invention with the concealed track at the end of the data medium.

FIG. 13 illustrates yet another embodiment of the present invention wherein two concealed tracks are placed between two data tracks.

FIG. 14 illustrates yet another embodiment of the present invention wherein a plurality of concealed tracks are located at the end of a storage medium.

Figures 1, 2:
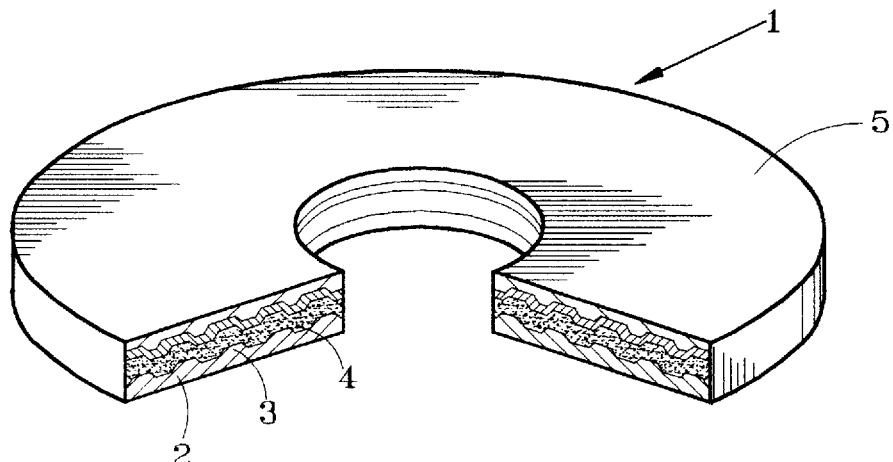
FIG. 1 is a partial cross section perspective view of a conventional compact disk (Prior Art).
FIG. 2 is a flow diagram illustrating the sequence of track counts on a conventional CD (Prior Art).

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

The presently preferred application of the present invention is for use with standard audio compact discs as found in, for example, music and record stores. However, the present invention can be adapted for use in other related storage media such as, for example, CD-ROM discs, mini-compact discs, single-session or multi-session Photo CDs, as well as 80-mm-diameter CD discs. A wide selection of CD storage media is available for entertainment, education, and business. A typical disc can hold over 650 megabytes (MB) of information—the equivalent of 270,000 pages of text, up to eight hours of speech and music (depending on the sound quality), hundreds of high-resolution images, or any combination of text, sound and graphics.

Standard music CDs provide sound and music recorded in a format typically referred to as digital audio. The present invention is especially adaptable for use in the digital audio format. Prior formats for storage media are silent with respect to concealing tracks or data between or adjacent to accessible tracks or data available for use.

Developers and industry producers have implemented numerous and varied standards or protocols. Of particular relevance are the CD standards co-developed by Philips and Sony for the digital audio format. The Phillips/Sony digital audio format is called "CD Digital Audio." The Philips/Sony CD Digital Audio technology is available for license from Philips in what is called the "Red Book." The Red Book standards have become the industry standards in the digital audio industry. The present invention provides a significant advancement to all known industry standards for digital audio technology, including the Red Book standards.

Further, the present invention has application to other known standards or protocols. Standards of relevance and possible application to the present invention are the Philips/Sony CD-ROM standards, known as the Yellow Book; the Philips/Sony CD-I standards, known the Green Book; the Philips/Sony Recordable CD standards, known as the Orange Book; the Philips/Sony CD-Video/Laser Disc standards; the Philips/Sony CD-ROM XA standards; the Philips/Sony CD-I Ready standards; the Philips/Sony CD-I Bridge standards; the Philips/Kodak Photo CD standard; and the Philips/JVC Video CD specification standard, known as the White Book.

Still further, the present invention has application to new standards or protocols being developed. Particularly, the new digital versatile disk ("DVD") format is adaptable for use with the present invention. The digital versatile disk format is or may be known as DVD-ROMs. The DVD-ROMs are similar to the typical CDs, but have a format which provides for storing more data. The capacity of the DVD-ROMs to hold data will be significantly greater than the normal CDs.

It is known in the industry to use a pre-gap on the compact disk. The pre-gap is a buffer between a start communication location on the CD and a first start mark indicative of a beginning location for the data recording area for the first track on the CD. The start communication location on the CD is typically closer to the than the perimeter of the CD so that the CD is transcribed in an outward expanding radial direction. The pre-gap is provided, indeed required, on CD's to assure that the player can align itself with the start mark. Typically, the pre-gap is two (2) seconds on a CD. The pre-gap can be termed a buffer.

The CD player provides an indexing mechanism. The indexing mechanism reads from the CD a table of contents. The table of contents associated with the CD determines, for example, the start and finish location, and respective times for the different tracks or groupings of data on the CD. The CD table of contents information is read by the player and stored in memory. Based upon the table of contents information from the CD, the memory in the player knows, for example, where each track begins, each track ends and the length of the respective track. Typically, the table of contents has the track locations. Each track has a beginning index point and may have an ending index point. Typically, the track will begin at index 1 and end at index 0. Thus, the begin play point is at track 1, index 1. If there are X tracks on a CD, the last play location would be track X, index 0. The location identified by track 1, index 1 is the begin play point.

Heretofore, the pre-gap provided a location point for aligning the CD in the player. The CD players are preprogrammed to locate the end of the pre-gap location, i.e. the predefined begin play location. Thereafter, the table of contents is read by the player and the player has been discovered to be programmed to remember the locations of each of the tracks on the CD. It is advantageous to use the pre-gap as an auxiliary recording zone. Thus, a conventional CD could be divided into two (2) recording zones, the pre-gap zone and the normal zone.

Using the pre-gap zone provides a new realm of functionality to the standard CD player market. No changes or adjustments need to be made to the CD player whatsoever. Typically, a CD player can access the pre-gap by pressing and holding the rewind button so that the player scrolls to the beginning of a pre-track. The length of the pre-track can be set during the time the CD's are manufactured. For example, in a conventional CD, to use the method of the present invention, termed the Justice Soundboard™ pre-track, the CD is inserted and the play button is pressed. After the play button engages the CD and the CD is aligned, the table of contents is read and the first track is presented for processing, the rewind button is pressed and held providing that the player scrolls to the beginning of the Justice Soundboard™ pre-track. When the front of the pre-track location is reached, the button can be released, and the pre-track zone data will be transcribed by the player. This provides the availability of multiple independent track recording on a conventional CD.

Figure 3:
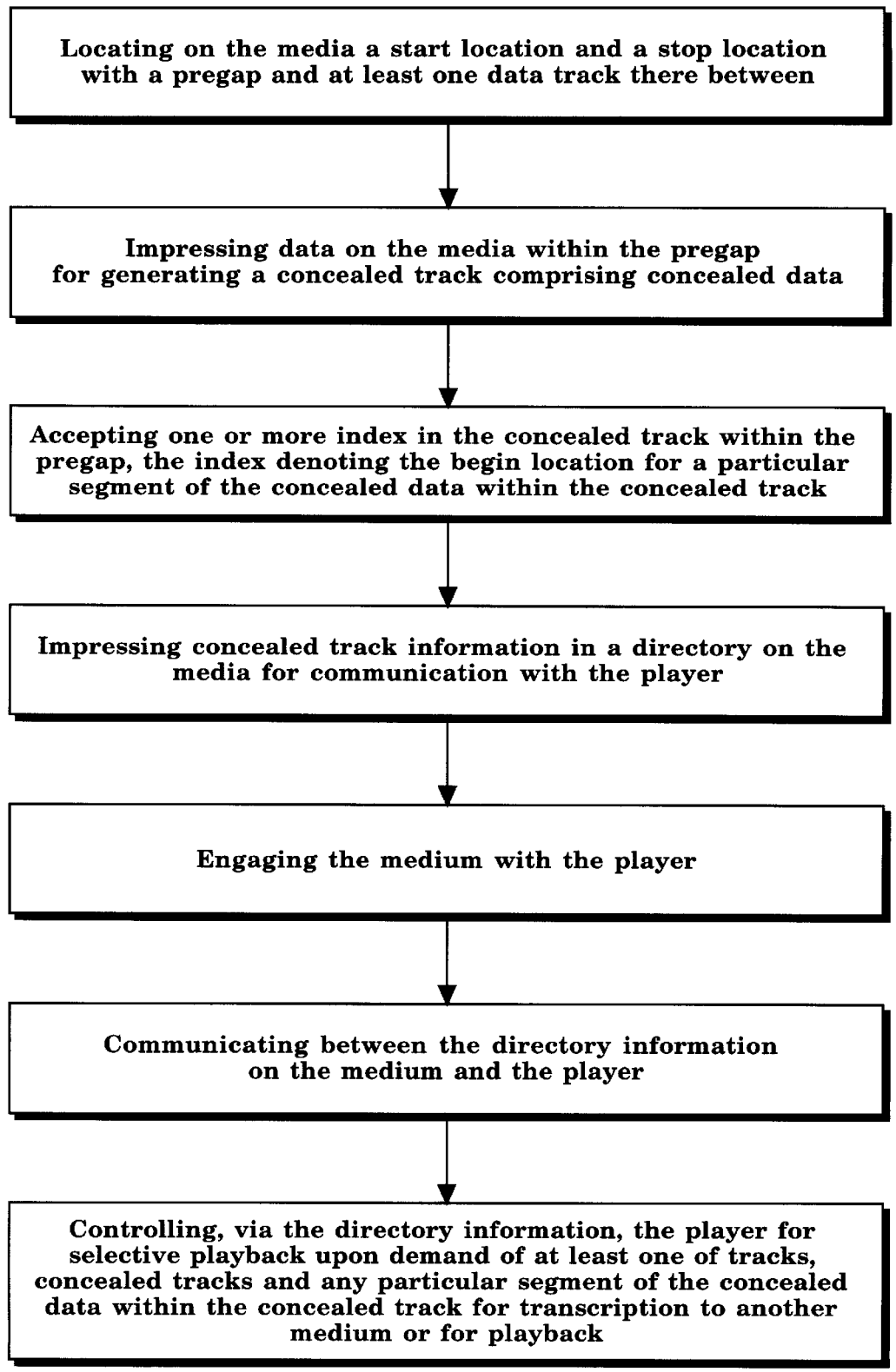
FIG. 3 is a flow diagram illustrating a preferred embodiment of the present invention.

FIG. 3 is a flow diagram illustrating the method of the present invention. The method provides for locating the begin play point on the medium sufficiently remote from the first play location for accepting data between the begin play point and the first play location. Data is impressed on the medium in the pretrack location, i.e., between the first play location and the begin play point. Then, data is placed on the media as normally done, for example, between the first play location and the last play location. Further, the method provides for engaging the player for locating the begin play point. The player can be further engaged to locate the first play location. Thereafter, the player is directed to transcribe the data from the media between the first play location and the begin play point, i.e., from the pre-gap zone. Thereafter, the player is provided access to transcribe the remaining data as normally would be transcribed from a CD by a player.

Figure 4:
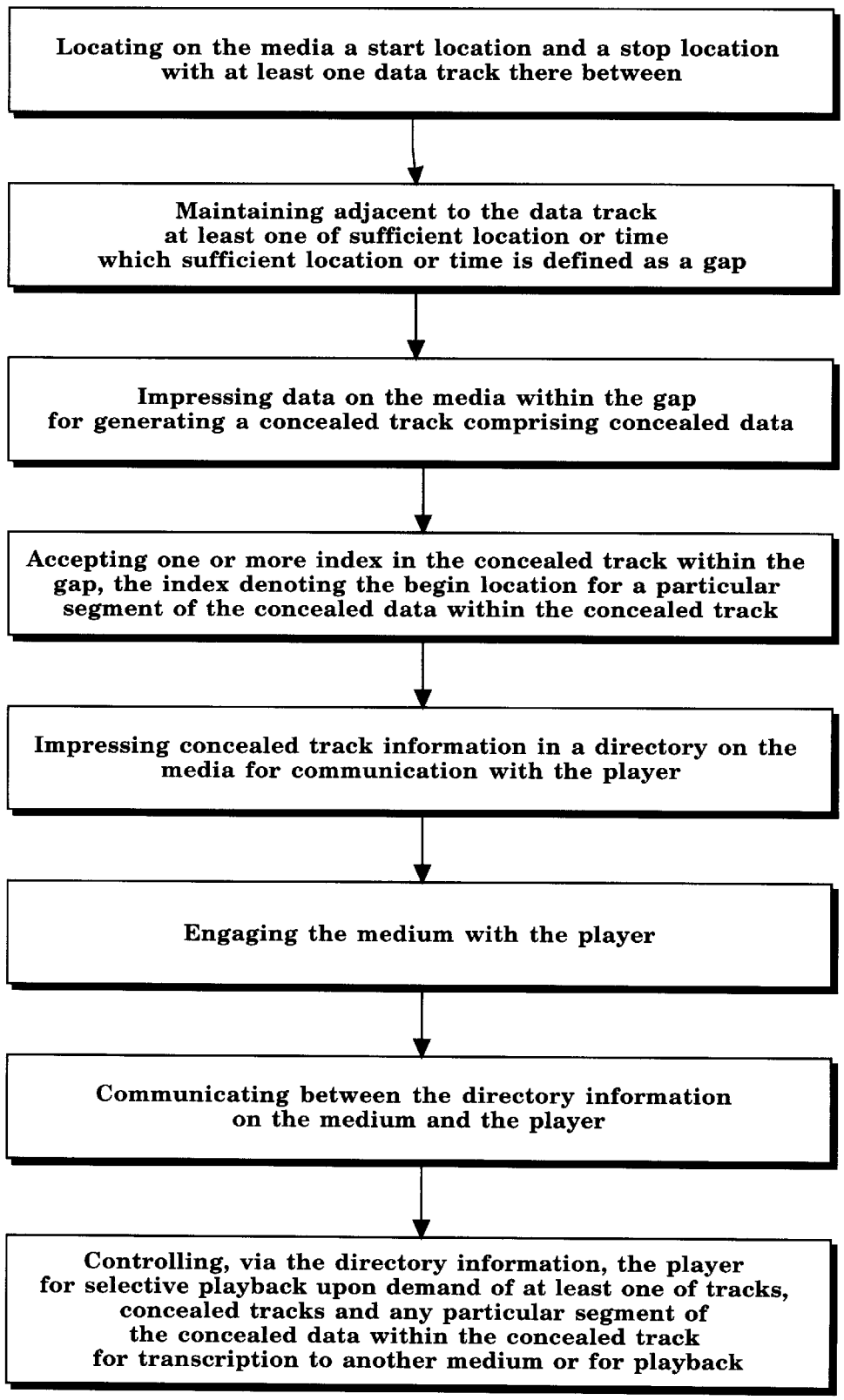
FIG. 4 is a flow diagram of another embodiment of the method of the present invention.

FIG. 4 illustrates another embodiment of the invention of the present application. The method identified in the flow diagram illustrated in FIG. 4 provides for locating the begin play point on the media sufficiently remote from the first play location for accepting data in a pretrack or pre-gap zone. Data is impressed on the pretrack or pre-gap zone which is located between the first play location and the begin play point. Further, as normally done on CD media, data is impressed between the begin play point and the end play point. Typically, this is done in a series of tracks. Thereafter, the player is engaged for locating the begin play point. After the begin play point is located, the player is further engaged to locate the first play location. The player can transcribe the data from the media between the first play location and the begin play location so that the pretrack data is transcribed from the pre-gap zone. Lastly, the player can transcribe the data as normally transcribed from between the first play location and the last play location. It can be appreciated that this same technique can be used in any medium. It is not just the CD medium in which the technique can be incorporated.

Figure 5:
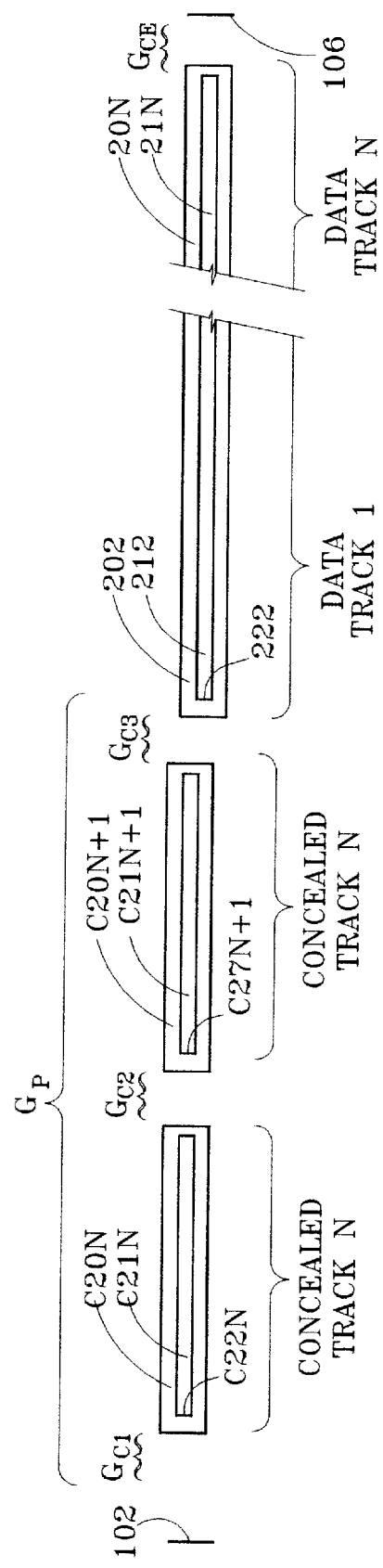
FIG. 5 is a schematic illustration of a representative configuration embodying a track layout using the pregap with the present invention.

FIG. 5 is a schematic illustration of a representative configuration embodying a track layout adaptable for use with the present invention. FIG. 5 illustrates a storage medium having three data tracks 202, 204, 206. The data tracks 202 through 20N are preceded by a start location 102 and a pregap $G_P$ and terminated by a stop location 106. Between the data tracks 202 through 20N and the start location 102 and the stop location 106 are gaps G. More particularly, the gaps G may be defined as a pre-gap $G_P$, a mid-gap $G_x$ (not shown), and an end gap $G_E$. The pregap $G_P$ includes the concealed gaps $G_{C1}$, $G_{C2}$, and $G_{C3}$ and the concealed tracks C20N through C20N+1. Each track 202 through 20N and C20N through C20N+1 has its respective recording area 212, 21N, C21N, C21N+1. Similarly, each recording area 212, 21N, C21N, C21N+1 has its respective index 222, C22N, C22N+1.

FIG. 6 is a schematic illustration of a representative configuration embodying a track layout adaptable for use with the present invention. FIG. 6 illustrates a storage medium having three data tracks 202, 204, 206. The data tracks 202, 204, 206 are preceded by a start location 102, and terminated by a stop location 106. Between the data tracks 202, 204, 206 and the start location 102 and the stop location 106 are gaps G. More particularly, the gaps G may be defined as a pre-gap $G_P$, a first mid-gap $G_1$, a second mid-gap $G_2$ and an end gap $G_E$. A begin communication location 302 is typically provided for the first data track 202. Further, a begin communication location 302, 304, 306 may be provided for each respective data track 202, 204, 206. It can be appreciated by those skilled in the art that the begin communication location 302 may be the only such location required. For example, the begin communication location 302 is typically adapted for use with a player or a transcriber so that the player or transcriber will know where to begin removing data from the storage medium. Each data track 202, 204 206 has its respective recording area 212, 214, 216. Similarly, each recording area 212, 214, 216 has its respective start position 222, 224, 226.

FIG. 7 is a generic illustration of the representative configuration as illustrated in FIG. 6. FIG. 7 illustrates that a plurality of tracks can be adapted for use with the storage medium and in conjunction with the present invention. FIG. 7 illustrates data tracks ranging from data track 1 through data track N. The data tracks provide for a following gap $G_1$ through $G_X$ and $G_E$. Of particular interest is the break away portion of FIG. 6 which illustrates that the data track 204 is spaced in time or distance from the subsequent illustrated data track 21X. The data track 21X is positioned so as to be separated from data track 21X+1 by the gap $G_X$. The data track 21X+1 is spaced remotely from the last data track 21N. The last data track 21N is illustrated being adjacent the end gap $G_E$. The end gap $G_E$ separates the data track 21N from the stop location 106.

Figure 9:
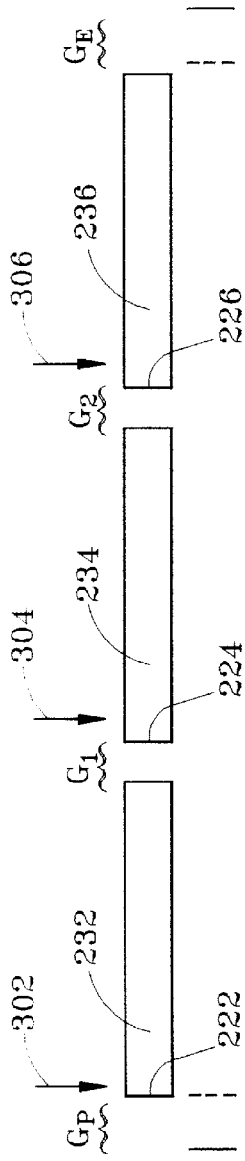
FIG. 9 illustrates an embodiment of a representative configuration wherein the track and recording areas are identical areas.
Figure 10:
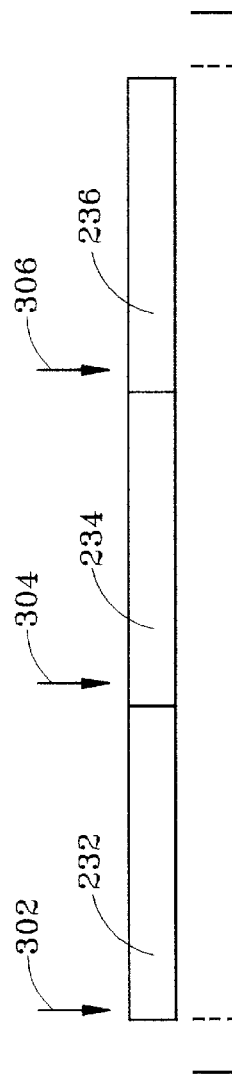
FIG. 10 illustrates another representative configuration of another track layout adaptable for use with the present invention.

It can be appreciated by those skilled in the art that the representative configurations adapted for use with the present invention can vary. FIGS. 8, 9 and 10 illustrate variations of representative configurations which can be adapted for use with the present invention. FIG. 9 illustrates an embodiment of a representative configuration wherein the track and recording areas are identical areas 232, 234, 236. The start position 222, 224, 226 for the respective track/recording areas 232, 234, 236 are used in a similar fashion as previously discussed. It can be appreciated that the tracks illustrated may include concealed tracks pursuant to the present invention. Also, the pre-gap $G_P$, mid-gaps $G_1$, $G_2$ and end-gap $G_E$ are provided as discussed in FIGS. 6 and 7.

FIGS. 8 and 9 illustrate another representative configuration of another track layout adaptable for use with the present invention. The configurations of FIGS. 8 and 10 illustrate tracks without gaps. It can be appreciated that the tracks illustrated may include concealed tracks pursuant to the present invention. Particularly, FIG. 8 illustrates the track 202 abutting the track 204. Also, the track 204 is illustrated abutting the track 206. The recording areas 212, 214, 216 are provided with respective start positions 222, 224, 226, as previously discussed. The pre-gap and post-gap of the representative configurations can exist or not exist as the case may be. For example, FIGS. 6, 8, 9, 10 illustrate a pre-gap $G_P$ existing and not existing, similarly FIGS. 6, 8, 9, 10 illustrate the end-gap $G_E$ existing and not existing. The pre-gaps $G_P$ are identified by labels 102 and 104. The end-gaps $G_E$ are identified by numerals 106 and 108.

Figure 11:
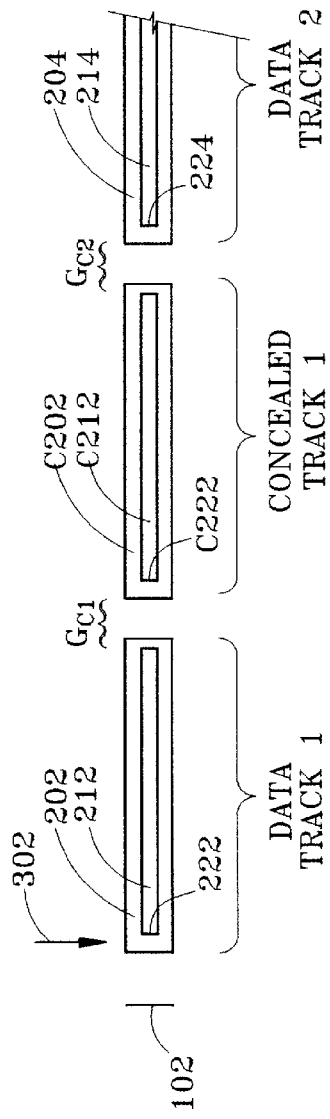
FIG. 11 is a schematic illustrating more particularly a concealed track disposed within a gap as practiced by the present invention.

FIG. 11 is a schematic illustrating more particularly a concealed track disposed within a gap $G_1$ as practiced by the present invention. FIG. 11 illustrates a data track 202 and a data track 204 having a gap $G_1$ there between. The data track 202 has a recording area 212 and a start position 222. The data tracks 202, 204 are preceded by a start location 102. The first data track 202 has a begin communication location 302 aligned in the general vicinity of the start position 222. The data track 204 has a recording area 214 and a start position 224. Between the data tracks 202, 204, is the concealed track C202. The concealed track C202 comprises a recording area C212 and a start position C222. The gap $G_1$ between the data tracks 202, 204 includes the entirety of the concealed track C202 and its adjacent gaps $G_{C1}$, $G_{C2}$. It can be appreciated by those skilled in the art that the gaps $G_{C1}$, $G_{C2}$ associated with the concealed track C202 can be of whatever dimensions are desired with respect to time or location. Also, it can be appreciated by those skilled in the art that the gaps can be displaced or omitted altogether such that the data track 202 abuts against the concealed track C202, and the concealed track C202 abuts against the other data track 204, thus, providing an embodiment without any gaps.

FIG. 12 illustrates yet another embodiment of the present invention with the concealed track C202 at the end of the data medium. FIG. 12 illustrates a plurality of data tracks 201-20N as illustrated with a break away. The break away provides that any number of data tracks can be disposed between the illustrated data tracks 202, 20N. The concealed track C202 having a recording area C212 and a start position C222 is disposed between the last data track 20N and the stop location 106. The gap $G_E$ between the last data track 20N and the stop location 106 provides for the full dimension of the concealed track C202 and its respective gaps $G_{C1}$, $G_{CE}$. As previously discussed, the respective gaps $G_{C1}$, $G_{CE}$ can be altered in size or eliminated completely.

FIG. 13 illustrates yet another embodiment of the present invention wherein two concealed tracks C202, C204 are placed between two data tracks 202, 204. The concealed tracks C202, C204 are, for example, placed near the beginning of the storage medium so as to be between the first two data tracks 202, 204. The concealed tracks C202, C204 and their associated gaps $G_{C1}$, $G_{C2}$, $G_{C3}$ fill the entire gap $G_1$ between the first data track 202 and the second data track 204. Each concealed data track C202, C204 has its recording area C212, C214 and start position C222, C224, respectively.

FIG. 14 illustrates yet another embodiment of the present invention wherein a plurality of concealed tracks C202, C204 are located at the end of a storage medium. FIG. 14 illustrates two of the plurality of concealed tracks C20N-1, C20N disposed between the last data track 20N and the stop location 106. The concealed data tracks C20N-1, C20N are disposed in the end gap $G_E$. The entire dimension of the end gap $G_E$ includes the first concealed gap $G_{C1}$, the concealed track C20N-1, the second concealed gap $G_{C2}$, the concealed track C20N and the gap $G_{CE}$. In its schematic representation, the embodiment of the invention illustrated in FIG. 14 expands the entire length of the storage medium from the start location 102 to the stop location 106. It can be appreciated that numerous concealed tracks can be placed in each respective gap between data tracks. Also, it can be appreciated that numerous concealed tracks can be placed in the pre-gap just as easily as has been illustrated in the mid-gaps and the end-gap.

Figure 15:
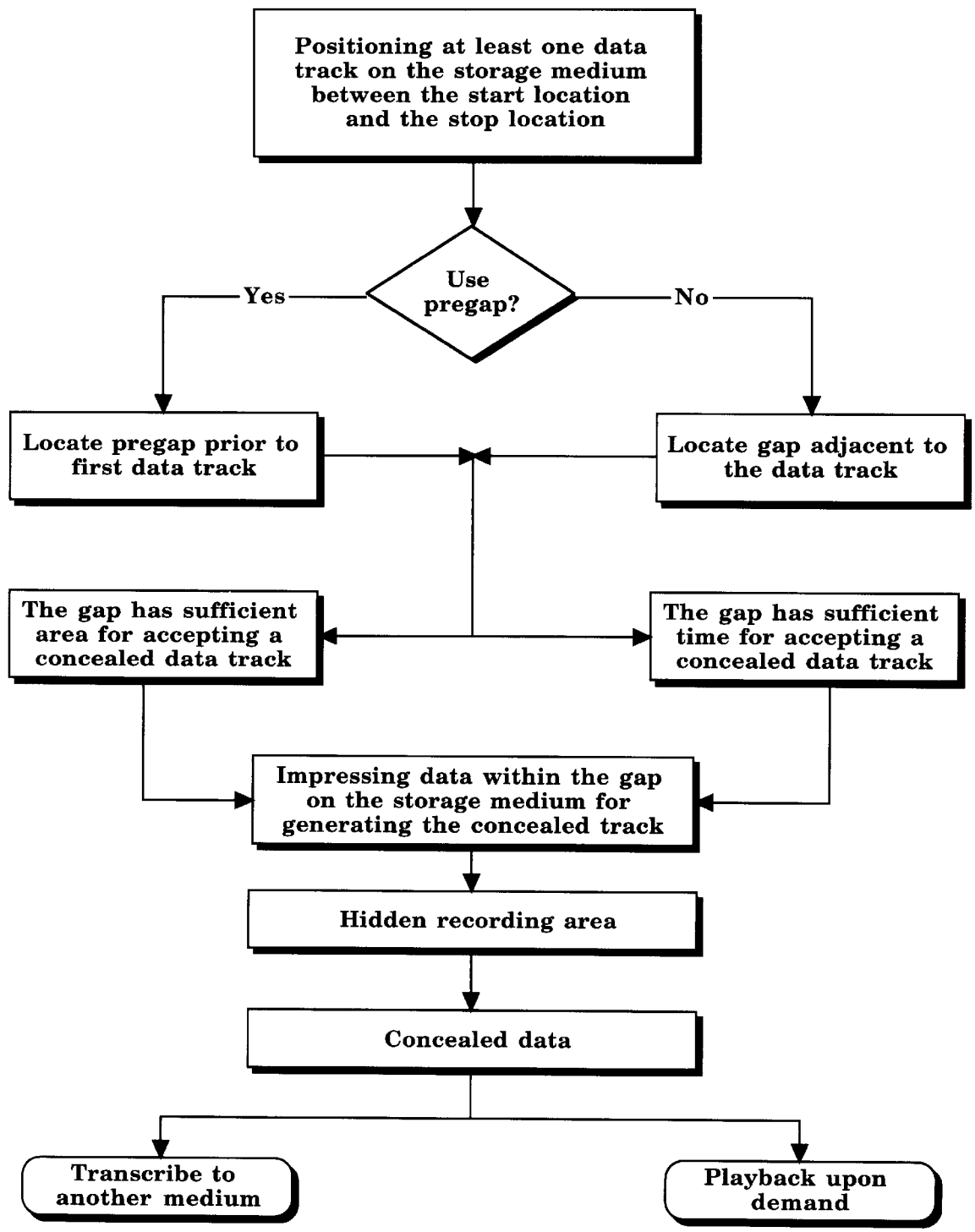
FIG. 15 is a flow chart illustrating one embodiment of the method of masking data on a storage medium as taught by the present invention.

FIG. 15 is a flow chart illustrating one embodiment of the method of masking data on a storage medium as taught by the present invention. The method illustrated in FIG. 15 provides for positioning at least one data track on the storage medium between the start location and the stop location. Whether to use the pregap, or not to use the pregap is determined. If the pregap is used, the pregap is located prior to the first data track. If the pregap is not used, the gap is located adjacent to any other data track, including after the last data track or before any data track. The pregap or gap is determined to have sufficient area or time for accepting a concealed data track. The data is impressed within the pregap or gap on the storage medium for generating the concealed track. Thus, a hidden recording area is generated such that concealed data is available via the player. The player can transcribe the concealed data to another medium or can use the concealed data for playback upon demand.

Figure 16:
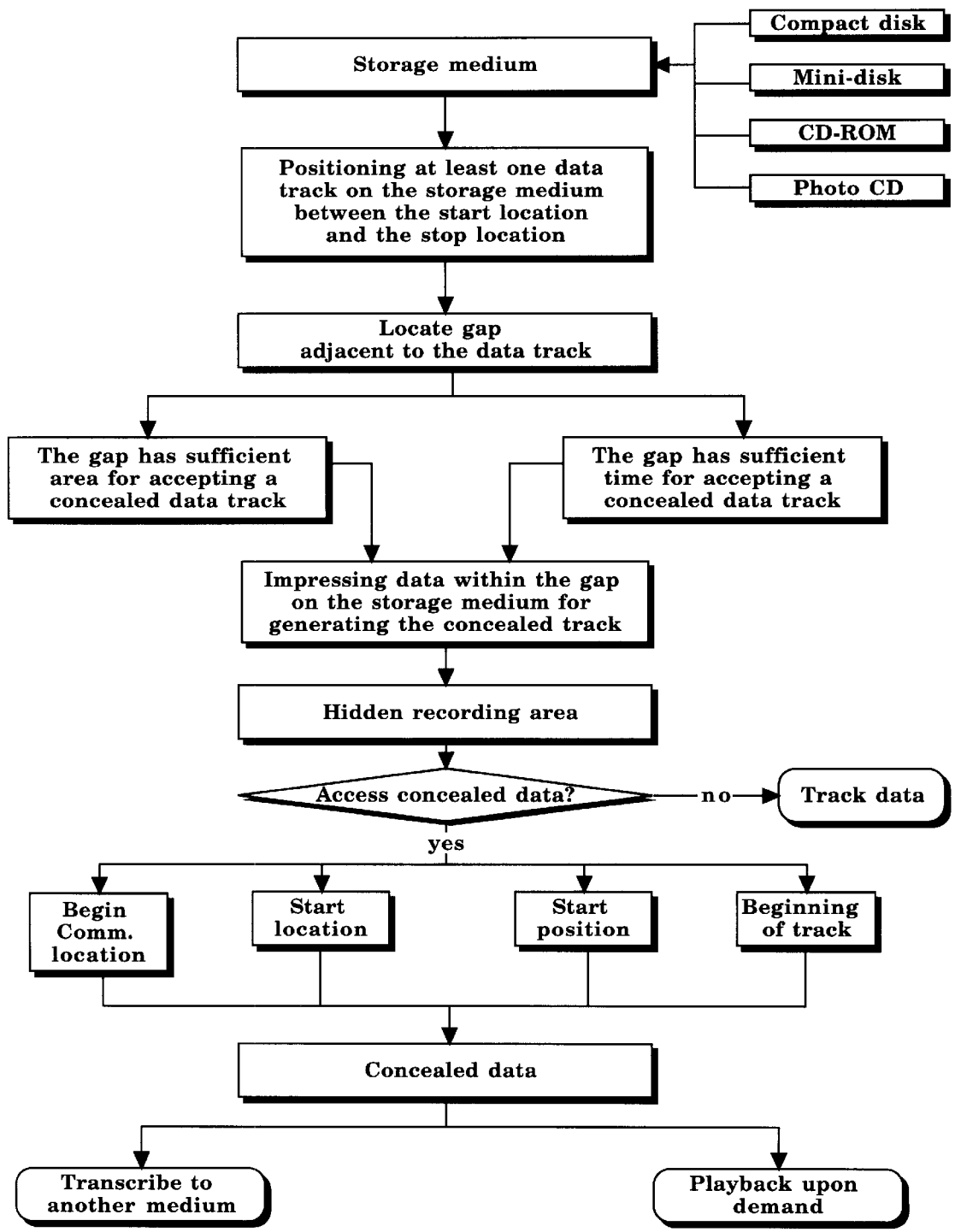
FIG. 16 is another flow chart illustrating a more detailed embodiment of the method of masking data on a storage medium as taught by the present invention.

FIG. 16 is another flow chart illustrating a more detailed embodiment of the method of masking on a storage medium as taught by the present invention. The storage mediums available are, for example, the digital versatile disk (DVD), the compact disk, the mini-disk, the CD-ROM or the photo CD. Typically, at least one data track is positioned on the medium between a start location and a stop location. It is determined whether to use the pregap or not to use the pregap. If the pregap is used, the pregap is positioned prior to the first data track. If the pregap is not used, the gap is adjacent to any data track, including after the last data track or prior to any other data track, except the first data track. The pregap or gap is determined to have sufficient area or time for accepting a concealed data track. The data track to be concealed is impressed within the pregap or gap on the storage medium for generating a concealed track with concealed data. The operator of the player determines whether to access concealed data or normal track data. If normal track data is accessed, the player is played normally and the concealed data is undetectable. If the operator of player elects to access concealed data, the directory information, per the instructions provided by the operator of player, identifies the index or start position for the appropriate concealed data. The concealed data is accessed by the player for transcription to another medium or for playback.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of masking data on an optical medium for selective playback upon demand or for transcription to another medium, the optical medium adapted for communication with a player or transcriber such that the optical medium has a start location and a stop location with a pregap and at least one data track therebetween, the pregap preceding the first track, the pregap is defined as at least one of sufficient location or time for accepting data, each data track including a data recording area for executing at least one of recording and reproducing the data, and each data track including at least one index which index identifies the beginning of at least one of recording and reproducing data, the first index in any data track is a start index indicative of a beginning location for the data recording area for that track, the start location of the optical medium precedes the first start index for the first track for at least one of location or time, and the stop location of the optical medium follows the last data recording area for the last track for at least one of location or time, the optical medium comprises a directory with information about the medium for communicating with the player or transcriber including information with respect to each data track and each index, the directory information provides control to the player for effective interaction with the medium, the method comprising the steps of:
(a) impressing data within the pregap for generating a concealed track adjacent the data track, the concealed track containing concealed data which can be accessed upon demand for transcription to another medium or for playback,
(b) accepting one or more index in the concealed track within the pregap, the index denoting the begin location for a particular segment of the concealed data within the concealed track,
(c) impressing concealed track information in the directory for communication with the player, the concealed track information enables the optical medium and the player or transcriber to communicate with respect to the concealed track,
(d) engaging the medium with the player for communication between the medium and the player such that the directory information guides the player for selective playback upon demand of at least one of tracks, concealed tracks and any particular segment of the concealed data within the concealed track for transcription to another medium or for playback.

2. A method of masking data on an optical medium for selective playback upon demand or for transcription to another medium, the optical medium adapted for communication with a player or transcriber such that the optical medium has a start location and a stop location with at least one data track therebetween, each data track including a data recording area for executing at least one of recording and reproducing the data, and each track including at least one index which index identifies the beginning of at least one of recording and reproducing data, the first index in any data track is a start index indicative of a beginning location for the data recording area for that track, the start location of the optical medium precedes the first start index for the first track for at least one of location or time, and the stop location of the optical medium follows the last data recording area for the last track for at least one of location or time, the optical medium comprises a directory with information about the medium for communicating with the player or transcriber including information with respect to each data track and each index, the directory information provides control to the player for effective interaction with the medium, the method comprising the steps of:
(a) positioning at least one data track on the optical medium between the start location and the stop location,
(b) maintaining adjacent to the data track at least one of sufficient location or time which sufficient location or time is defined as a gap,
(c) impressing data within the gap for generating a concealed track adjacent the data track, the concealed track containing concealed data which can be accessed upon demand for transcription to another medium or for playback,
(d) impressing concealed track information in the directory for communication with the player the concealed track information enables the optical medium and the player or transcriber to communicate with respect to the concealed track.

3. The method of masking data on an optical medium for selective playback upon demand or for transcription to another medium as defined in claim 2 further comprising the step of accepting one or more index within the concealed track, the index denoting the begin location for a particular segment of the concealed data within the concealed track.

4. The method of masking data on an optical medium as defined in claim 2 further comprising the step of engaging the medium with the player for communication between the medium and the player such that the directory information guides the player for selective playback upon demand of at least one of tracks and concealed tracks for transcription to another medium or for playback.

5. An optical medium containing data for communication with a player, transcriber or the like, the medium comprising:

(a) a start location, (b) a stop location, (c) a directory impressed on the medium having information about the medium for communication with the player including information with respect to each data track and each index, the directory information provides control to the player for effective interaction with the medium, (d) at least one data track between the start location and the stop location, each data track further comprising a data recording area and at least one index, the data recording area for executing at least one of recording and reproducing the data, the index indicative of a beginning location for the data recording area for a segment of the track, the start location precedes the first index for the first track for at least one of location or time, and the stop location follows the last data recording area for the last track for at least one of location or time, the first index is indicative of the beginning of the data recording area for a first track and the index for each subsequent track, if any, is indicative of the beginning of the data recording area for the respective track, such that at least one data track is on the medium between the start location and the stop location, and (e) a pregap prior to the first index, the pregap comprising data impressed on the medium including at least one index, the pregap defining a concealed track having a hidden recording area containing concealed data which can be accessed upon demand by the player or transcriber for transcription to another medium or for playback, the index indicative of the begin location for a segment of the concealed data within the concealed track of the pregap, such that the engagement of the medium with the player provides communication therebetween whereby the directory information guides the player for selective playback upon demand of at least one of tracks, concealed tracks and any segment of the concealed data within the concealed track for transcription to another medium or for playback.

6. An optical medium containing data for communication with a player, transcriber or the like, the medium comprising:

(a) a start location, (b) a stop location, (c) a directory impressed on the medium having information about the medium for communication with the player including information with respect to each data track and each index, the directory information provides control to the player for effective interaction with the medium, (d) at least one data track between the start location and the stop location, each data track further comprising a data recording area and at least one index, the data recording area for executing at least one of recording and reproducing the data, the index indicative of a beginning location for the data recording area for a segment of the track, the start location precedes the first index for the first track for at least one of location or time, and the stop location follows the last data recording area for the last track for at least one of location or time, the first index is indicative of the beginning of the data recording area for a first track and the index for each subsequent track, if any, is indicative of the beginning of the data recording area for the respective track, such that at least one data track is on the medium between the start location and the stop location, and (e) a gap comprising data impressed on the medium including at least one index, the gap defining a concealed track having a hidden recording area containing concealed data which can be accessed upon demand by the player or transcriber for transcription to another medium or for playback, the index indicative of the begin location for a segment of the concealed data within the concealed track of the gap, such that the engagement of the medium with the player provides communication therebetween whereby the directory information guides the player for selective playback upon demand of at least one of tracks, concealed tracks and any segment of the concealed data within the concealed track for transcription to another medium or for playback.

* * * * *